A. L. CARLSON.
HAY RACK ATTACHMENT.
APPLICATION FILED SEPT. 5, 1908.
913,693.
Patented Mar. 2, 1909.
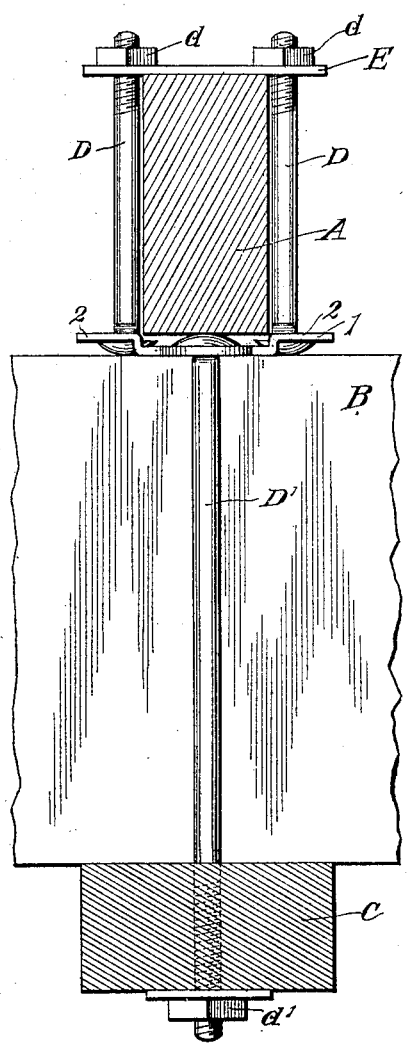
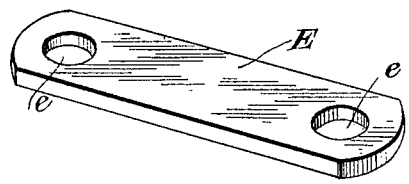
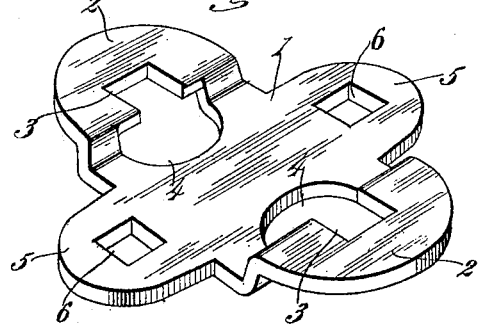
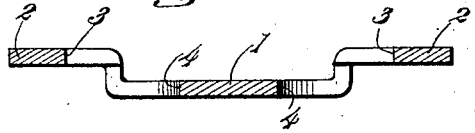
Witnesses
Rou S. Johnson
L. E. Little
Inventor
Axel L. Carlson
By Watson E. Coleman
Attorney

UNITED STATES PATENT OFFICE.

AXEL L. CARLSON, OF CENTER CITY, MINNESOTA.

HAY-RACK ATTACHMENT.

No. 913,693.        Specification of Letters Patent.        Patented March 2, 1909.

Application filed September 5, 1908. Serial No. 451,858.

*To all whom it may concern:*

Be it known that I, AXEL L. CARLSON, a citizen of the United States, residing at Center City, in the county of Chicago and State of Minnesota, have invented certain new and useful Improvements in Hay-Rack Attachments, of which the following is a specification, reference being had to the accompanying drawings.

My invention relates to improvements in means for connecting the members of a hay rack.

The object of the invention is to provide a simple and inexpensive connecting member or plate in connection with which ordinary carriage bolts of different sizes may be used so that rack members of different sizes may be connected and which will be of such construction as to hold the bolts against rotation whereby their nuts may be readily applied to, adjusted on and removed from them.

With this object in view, the invention consists in the novel construction and the combination of parts hereinafter described and claimed, and illustrated in the accompanying drawings, in which—

Figure 1 is a section through one end of a hay rack showing the application of the invention; Fig. 2 is a perspective view of the clip plate; Fig. 3 is a perspective view of the improved connecting member or plate; and Fig. 4 is a sectional view through the latter.

In the drawings A represents an upper cross beam, B a longitudinal stringer, C a lower cross beam and 1 the improved connecting member or plate which is interposed between the beam A and stringer B and which co-acts with two clips to unite the beams and stringer. One of said clips consists of two bolts D arranged on opposite sides of the upper cross beam A and having their threaded ends projecting through openings *e* in a clip plate E and engaged by nuts *d*, which latter hold the plate E on top of the beam A. The other clip consists of two bolts D′ arranged on opposite sides of the stringer B and having their threaded ends passed through openings in the lower cross beam C and engaged by nuts *d*′, as clearly shown in Fig. 1.

The improved connecting member 1 is preferably stamped from a single sheet or plate of metal and has a flat central portion formed at opposite points with laterally offset ears 2 which form a channel, as shown. The ears 2 are formed with openings 3 of square or other polygonal shape to receive the flat faces or shoulders formed on the bolts D adjacent their heads, said bolts D, as well as the bolts D′ being ordinary carriage bolts. To facilitate the insertion of the bolts D in the openings 3 and their removal therefrom larger openings 4 are formed in the member or plate 1 adjacent the openings 3 and in communication therewith, as clearly shown in Fig. 3 of the drawings, said openings 4 being of such size as to permit the enlarged heads of the bolts to be readily slipped under the ears 2. At opposite points on the member or plate 1 and midway between the ears 2 are formed ears 5 which are disposed in the plane of the flat body or central portion of said plate and which have square or other flat faced openings 6 to receive the squared or shouldered portions on the carriage bolts D′ immediately beneath the heads of the latter. By making the openings 3, 6 in the lugs 2, 5 of square or polygonal form and employing bolts D, D′ with similar-shaped portions adjacent their heads, the ordinary carriage bolts may be used in connection with the member or plate 1 and they will be effectively prevented from rotating while their nuts *d*, *d*′ are being applied to, adjusted upon or removed from them. By making the member or plate 1 as set forth it may be quickly and inexpensively stamped from a single piece of metal plate and the bolts will be effectively retained in it even though their nuts should work loose. Since the bolts cannot turn in the member or plate no tool other than a wrench is necessary to apply the device to or remove it from the members of the rack and wagon.

In using the invention, the member or plate 1 is placed upon the stringer B after the latter has been arranged upon the lower beam C and these parts are connected by means of the bolts D′. The heads of the bolts D are then inserted in the openings 4 and beneath the ears 2 and after the upper beam A has been placed between them the clip plate E and nuts *d* are applied, as shown in Fig. 1.

Having thus described the invention what is claimed is:

1. A connecting member of the character described comprising a plate formed at opposite points with apertured ears and at opposite points intermediate the first mentioned ears with offset apertured ears, portions of the plate adjacent the offset ears being cut away to form openings in communication with the apertures in said offset ears, for the purpose specified.

2. In a device of the character described, the combination with a lower transverse member, a longitudinal stringer and an upper transverse member, of a connecting member comprising a plate interposed between the upper member and stringer and formed with two pairs of apertured ears, the ears of each pair projecting in opposite directions, those of one pair projecting from the opposite sides of the stringer and those of the other pair from the opposite sides of the upper transverse member and being disposed above said stringer, the last mentioned pair of ears being offset and two pairs of bolts arranged in said apertured ears, the bolts of one pair having their threaded ends extending downwardly on opposite sides of the stringer and connected to the lower transverse member and the bolts of the other pair having their threaded ends projecting upwardly on opposite sides of the upper transverse member and secured to the same, each of said bolts having adjacent its head a flat faced portion to engage flat faced walls of the apertures or openings in said ears, whereby the bolts will be prevented from rotating when arranged in said ears, said plate having its portions adjacent the offset ears cut away to provide openings in communication with the openings or apertures in said offset ears, for the purpose set forth.

In testimony whereof I hereunto affix my signature in the presence of two witnesses.

AXEL L. CARLSON.

Witnesses:
ALFRED P. WALBERG,
ROZETTA JOHNSON.